US012801226B2

(12) United States Patent
Lei et al.

(10) Patent No.: US 12,801,226 B2
(45) Date of Patent: Nov. 17, 2026

(54) MOUSE WITH INTEGRATED OPTICAL MODULE

(71) Applicant: Microsoft Technology Licensing, LLC, Redmond, WA (US)

(72) Inventors: Pengfei Lei, Shenzhen City (CN); Stephen Chi Hung Chiu, Kaohsiung (TW); Chunde Liu, Shenzhen City (CN); Kelong Zhao, Shenzhen City (CN); Simon Cameron Dearsley, Ohoka (NZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/861,438

(22) PCT Filed: May 26, 2022

(86) PCT No.: PCT/CN2022/095244
§ 371 (c)(1),
(2) Date: Oct. 29, 2024

(87) PCT Pub. No.: WO2023/225942
PCT Pub. Date: Nov. 30, 2023

(65) Prior Publication Data

US 2025/0291433 A1 Sep. 18, 2025

(51) Int. Cl.
*G06F 3/0354* (2013.01)
*G06F 3/03* (2006.01)

(52) U.S. Cl.
CPC ........ *G06F 3/03543* (2013.01); *G06F 3/0304* (2013.01)

(58) Field of Classification Search
CPC .... G06F 3/03543; G06F 3/0304; G06F 3/033; G06F 3/0317; G06F 3/0362; G01L 1/24; G01L 1/00
See application file for complete search history.

(56) References Cited

U.S. PATENT DOCUMENTS 6,304,249 B1 * 10/2001 Derocher ............ G06F 3/03543 248/118.1
6,369,797 B1 * 4/2002 Maynard, Jr. ........... G06F 3/039 345/163

(Continued)

FOREIGN PATENT DOCUMENTS

CN 2456226 Y 10/2001
CN 102339144 A 2/2012

(Continued)

OTHER PUBLICATIONS

"AUPERTO Mouse Foldable Silent Wireless Computer Mouse Arc Touch Roller Mice Ultra Thin Gaming Folding (2.4 GHz ) White", Retrieved from: https://www.walmart.com/ip/AUPERTO-Mouse-Foldable-Silent-Wireless-Computer-Mouse-Arc-Touch-Roller-Mice-Ultra-Thin-Gaming-Folding-2-4-GHz-WHITE/195237451, Retrieved date: Mar. 25, 2022, 4 Pages.

(Continued)

*Primary Examiner* — Bryan Earles
(74) *Attorney, Agent, or Firm* — Holzer Patel Drennan

(57) ABSTRACT

The described technology includes a mouse device with a foot pad integrated with an optical sensor circuit for synchronized movement. Implementation of the mouse device include a foot pad configured to movably rest on a surface, a tactile switch configured to be attached to the foot pad, the tactile switch configured to generate an optical signal based at least on compression of the active foot pad, and an optical sensor circuit configured to detect the optical signal, wherein the optical sensor circuit is mechanically coupled to the foot pad.

20 Claims, 7 Drawing Sheets

(56) References Cited

U.S. PATENT DOCUMENTS

| | | | | | |
|---|---|---|---|---|---|
| 7,791,590 | B1 * | 9/2010 | Gordon | G06F 3/033 345/158 |
| 8,421,753 | B2 * | 4/2013 | Zucker | G06F 3/03543 345/163 |
| 9,240,299 | B2 | 1/2016 | Chiang | |
| 9,665,191 | B2 * | 5/2017 | Casparian | G06F 3/0383 |
| 2007/0097077 | A1 * | 5/2007 | Ishikawa | G06F 3/03544 345/163 |
| 2009/0027340 | A1 * | 1/2009 | Huang | G06F 3/03543 345/166 |
| 2010/0053084 | A1 | 3/2010 | Chatterjee et al. | |
| 2010/0310299 | A1 * | 12/2010 | Lapstun | B43K 7/02 401/195 |
| 2011/0310016 | A1 * | 12/2011 | Zucker | G06F 3/03543 206/524.6 |
| 2014/0225832 | A1 * | 8/2014 | Wright | G06F 3/03543 345/163 |
| 2015/0138093 | A1 * | 5/2015 | Young | G06F 3/0312 345/166 |

FOREIGN PATENT DOCUMENTS

| | | | |
|---|---|---|---|
| CN | 202929575 | U | 9/2012 |
| CN | 208477487 | U | 2/2019 |
| CN | 111459317 | A | 7/2020 |
| DE | 29623077 | U1 | 10/1997 |

OTHER PUBLICATIONS

International Search Report and Written Opinion Issued in PCT Application No. PCT/CN22/095244 Mailed Date: Nov. 11, 2022, 12 Pages.

Communication under Rule 94(3) Received for European Application No. 22729423.8, mailed on Aug. 12, 2026, 08 pages.

* cited by examiner

MOUSE WITH INTEGRATED OPTICAL MODULE

BACKGROUND

Computing devices include types of input devices such as keyboards, trackpads, mouse, touchscreen pen, etc. Generally, users of desktop computer, as well as users of laptop computers and tablet devices, often use a mouse that is used provide tactile inputs to the computing device from user. Mouse devices can be wired or wireless and they generally include roller, ball, or other mechanisms on top surface of the mouse to receive user input.

SUMMARY

The described technology includes a mouse device with a foot pad integrated with an optical sensor circuit for synchronized movement. Implementation of the mouse device include a foot pad configured to movably rest on a surface, a tactile switch configured to be attached to the foot pad, the tactile switch configured to generate an optical signal based at least on compression of the active foot pad, and an optical sensor circuit configured to detect the optical signal, wherein the optical sensor circuit is mechanically coupled to the foot pad.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTIONS

The technology disclosed herein provides the structure of a computer mouse. In one implementations of the computer mouse disclosed herein the mouse has an arc shape with a rear bottom edge and a front bottom edge. Along the rear bottom edge of the computer mouse is a rail, also referred to as a foot pad, partially enclosed within the housing of the computer mouse and protruding from the housing. The foot pad contacts the surface on which the mouse is placed. When downward force is applied by a user to the top of the computer mouse, the foot pad along the back bottom surface of the computer mouse can be compressed into the housing of the computer mouse.

The housing of the mouse includes various components including an optical sensor to detect the compression of the foot pad. Specifically, the compression of the foot pad into the housing of the mouse is detected by the optical sensor as user mouse input. In one implementation, the optical sensor is located within the housing of the mouse and is mounted on a bracket that is mechanically coupled to the foot pad. As a result of such coupling of the optical sensor and the foot pad the movement of the foot pad into the computer mouse housing causes corresponding movement of the optical sensor.

Figure 1:
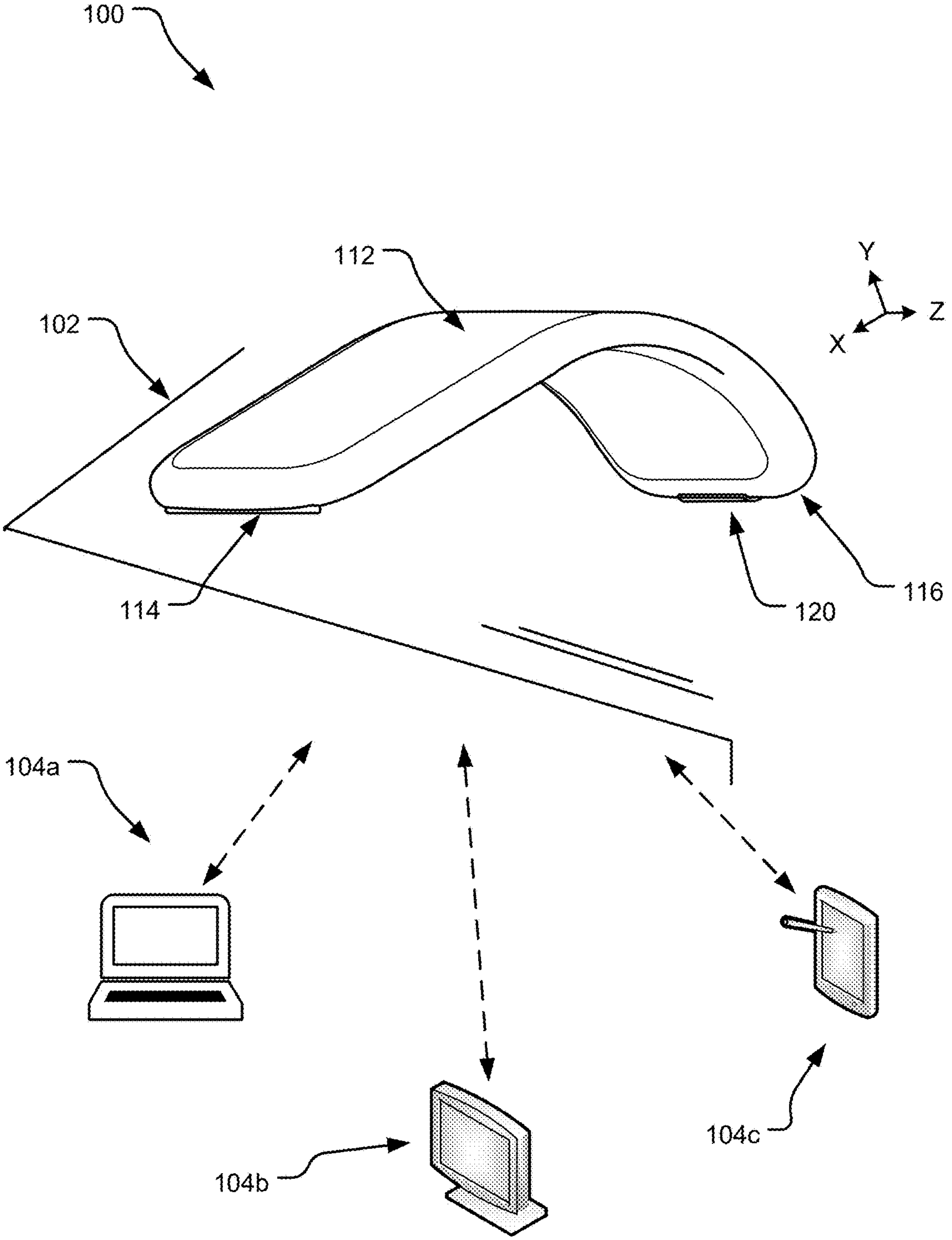
FIG. 1 illustrates an example mouse device disclosed herein that can be used with various computing devices.

FIG. 1 illustrates a mouse device 100 that can be used with various computing devices. Specifically, the mouse 100 is illustrated to be resting on a surface 102 and communicating with various computing devices 104, such as a laptop 104*a*, a desktop 104*b*, a tablet device 104*c*, etc. The direction of the two axis of the surface 102 re along the x and z direction as illustrated in FIG. 1. The illustrated implementation of the mouse 100 is illustrated to have an arc shape with a top surface 112, a front bottom edge 114, and a rear bottom edge 116. Note that while the shape of the mouse 100 in the illustrated implementation is an arc shape, in alternative implementation the shape may be different, such as for example, triangular with the top surface 112 comprising two surfaces at an angle to each other.

A user may be able to hold the mouse 100 by her palm resting over the top surface 112 of the mouse 100. In the illustrated implementation of the mouse 100, the top surface 112 is does not have any opening. In other words, the top surface 112 of the mouse 100 is substantially contiguous in that there are no additional components, such as a roller, a pin, etc., on the top surface 112 of the mouse 100. Having a top surface 112 that is without any opening provides technical benefit in that it reduces the likelihood of any debris, liquid, or other undesired dirt getting in the housing of the mouse. Furthermore, having a no opening on the top surface 112 also reduces the likelihood of malfunctioning of the mechanical components such as a roller, a pin, etc., as they are interacting with the other components of the mouse 100 inside the housing. Finally, having a top surface 112 without any openings also provides an enhanced user experience as the user is able to hold on to the smoother top surface 112 without any additional components sticking out from there.

The rear bottom edge 116 of the mouse may be configured to enclose a foot pad 120 that is partially enclosed within the housing of the mouse 102 and is partially protruding from the housing of the mouse 102. The bottom edge of the foot pad 120 may be substantially flat and may be in contact with the surface 102 and rest thereon. As a user exerts force on the top surface 112 in the y-direction, that is in a direction substantially perpendicular to the surface 102, the foot pad 120 may be compressed into the housing of the mouse 100.

In one implementation of the mouse 100, the foot pad 120 is configured on a bracket within the housing of the mouse 100. Furthermore, the bracket is also attached to a tactile switch and an optical sensor circuit such that the optical sensor circuit is mechanically coupled to the foot pad. Specifically, the tactile switch generates an optical signal based at least on compression of the active foot pad 120 and the optical sensor circuit detects the optical signal, which is used to generate a signal to the computing device 104 based at least on the pressure exerted by a user on the top surface 112. As the optical sensor is mounted on the bracket so as to be mechanically coupled to the foot pad 120, as the foot pad is compressed into the housing of the mouse 100 based at least on pressure applied by a user, the optical signal detected by the optical sensor is commensurate to the pressure applied by the user.

The mechanical coupling of the optical sensor to the foot pad buy mounting each of them on the same bracket allows for the movement of the optical sensor corresponding to the movement of the foot pad 120 into the housing. Therefore, the signal generated by the optical sensor is also commensurate to the pressure applied by the user on the top surface 112 of the mouse 100. Thus, the structure of the mouse 100 allows for relocating the mechanical component that generates a movement based at least on the pressure applied by the user, in this case the foot pad 120, to the bottom surface of the mouse 100, while still being able to detect an optical signal that is commensurate to the pressure applied by a user on the top surface.

Figure 2:
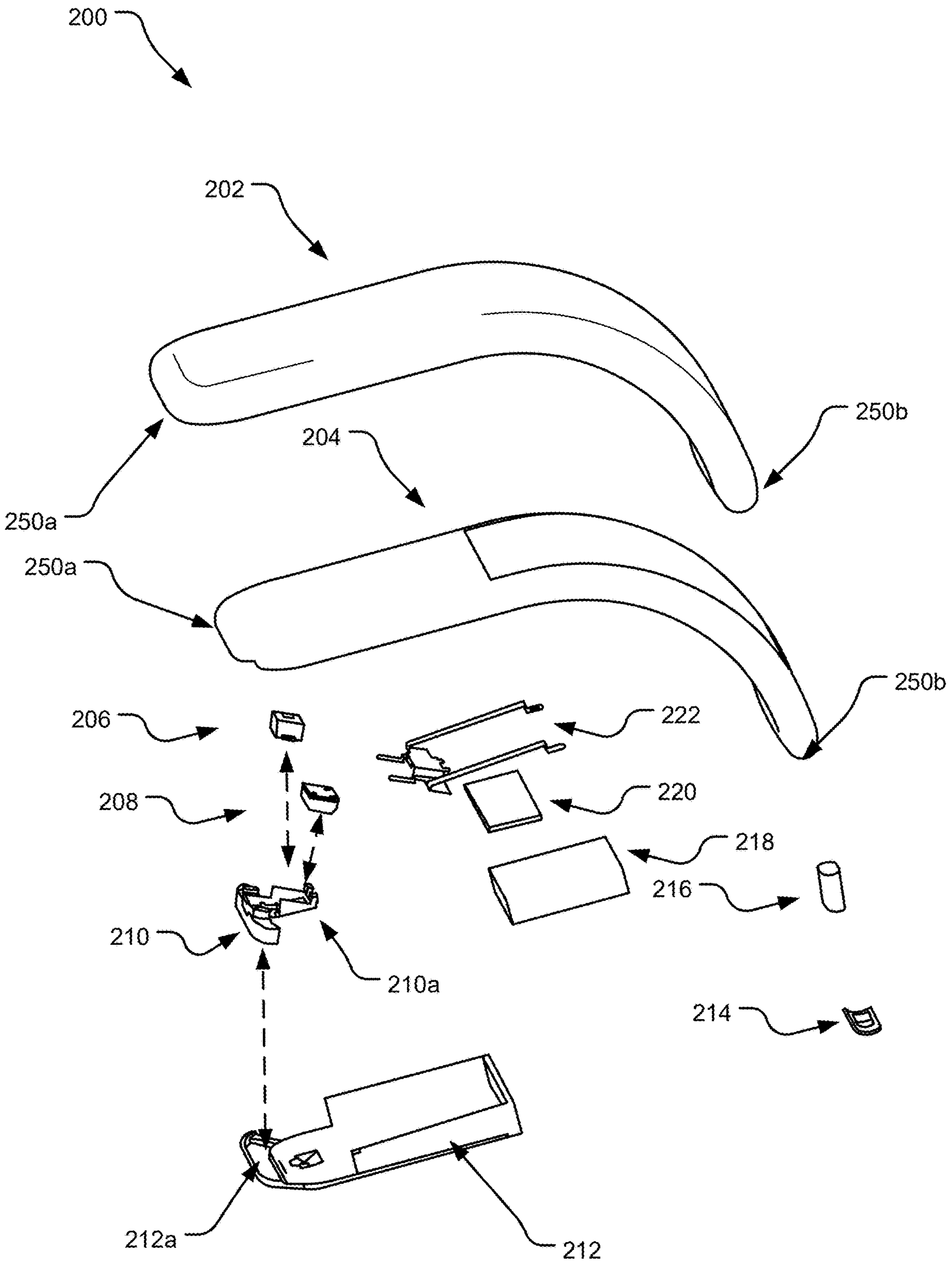
FIG. 2 illustrates an example assembly of components used in the mouse disclosed herein.

FIG. 2 illustrates an example mouse component assembly 200. Specifically, the mouse component assembly 200 includes a thermoplastic polyurethane (TPU) cover 202 that may be used to cover a mouse core 204. The TPU cover 202 provides a soft surface for a user to hold the mouse. The TPU cover 202 is seamless in that there are no openings therein. The mouse core 204 may have an arc shape. Each of the TPU cover 202 and the mouse core 204 may have a rear bottom edge 250*a* and a front bottom edge 250*b*. Specifically, a user may rest her palm on the top surface of the TPU cover 202 such that the user's fingers are resting closer to the front bottom edge 250*b* and the user's wrist is resting closer to the front rear edge 250*a*. As a result, the user is able to exert downward pressure on the mouse using her palm.

The mouse component assembly 200 also includes a tactile switch 206, an optical sensor circuit 208, and a foot pad 210 that is attached to a bracket 210*a*. The optical sensor circuit 208 may include a light emitting diode (LED) that generates light signal, an optical sensor that receives the light signal and generates an electrical signal based at least on the light signal, a digital signal processor (DSP) that processes the light signal generated by the optical sensor, etc. Specifically, the bracket 210*a* is configured to mechanically attach the Microsoft Licensing Technology, LLC in tactile switch 206 and the optical sensor circuit 208 therein. The foot pad 210 is also referred to as the active foot pad 210 as it moves based at least on the pressure on the mouse 200. Therefore, the optical sensor circuit 208 is mechanically coupled to the foot pad 210 so that movement of the foot pad 210 into the mouse housing 204 causes corresponding movement of the optical sensor within the optical sensor circuit 208. The mechanical coupling of the food pad 210 and the optical sensor 208 allows determining accurate movement of the foot pad 210 into the housing 204 as the user exerts pressure onto the top surface of the mouse 200. As a result, the structure of the mouse 200 allows it to have the mechanically moving component, the foot pad 210, at the bottom of the mouse 200 and resting on a surface, such as a mouse pad, a table, etc. By providing the mechanically moving component at the bottom surface of the mouse 200, the mouse 200 can be configured so that there are no openings for any mechanically moving parts on the top surface of the mouse 200.

The bracket 210*a* is configured within a bottom case 212 such that the foot pad 210 can move in and out of the bottom case 212 through an opening 212*a*. Specifically, the bottom case is attached to the mouse core 204 such that when a user exerts pressure on top of the mouse 200, the foot pad 210 may move in and out of the opening 212*a* of the bottom case 212 in a direction substantially vertical to the surface on which the mouse 200 is placed. The optical sensor circuit 208 generates an output signal commensurate to the movement of the foot pad 210 based at least on the pressure exerted by the user on the mouse 200.

The mouse 200 also includes a back foot pad 214 that attaches to the front bottom edge 250*b* of the mouse core 204. Thus, the mouse 200 may rest on a flat surface on the foot pad 210 or active foot pad 210 and the back foot pad 214. The bottom case 212 is also configured to house a universal service bus connector (USB-C) port 216 and a rechargeable battery 218 therein such that the rechargeable battery 218 can be recharged via a connector plugged into the USB-C port 216. A printed circuit board assembly (PCBA), also configured to be located in the bottom case 212 may be communicatively connected to the optical sensor circuit 208 to receive the electrical signal generated by the optical sensor circuit 208 based at least on the pressure exerted by the user, process the electrical signal generated by the optical sensor circuit 208, and communicate the processed signal to a computing device.

A metal clip 222, housed within the bottom case 212, is configured to provide spring mechanism to the mouse 200. Thus, as the user applies pressure to the top surface of the mouse 200, the metal clip 222 has enough elasticity so that the active foot pad 210 moves into the mouse core 204. However, as the user releases the pressure applied to the mouse 200, the metal clip 222 moves the mouse core 204 away from the surface that the mouse 200 is resting on such that he active foot pad 210 moves out of the mouse core 204—or protrudes further through the opening 212*a* of the bottom case 212.

Figure 3:
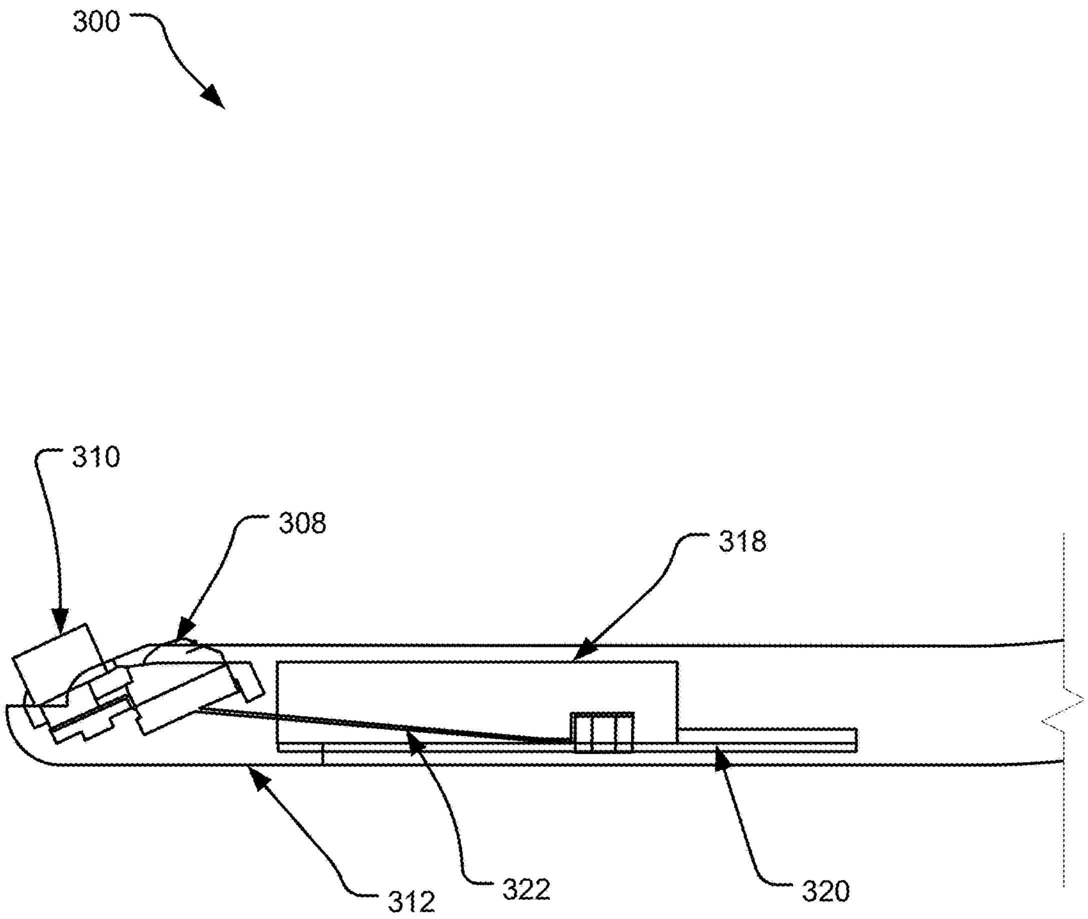
FIG. 3 illustrates an example side view of a section of the mouse disclosed herein.

FIG. 3 illustrates an example side view of a section of the mouse 300 disclosed herein. Specifically, the section of the mouse 300 illustrates a bottom case 312 of the mouse 300 housing a metal clip 322, a PCBA 320, a rechargeable battery 318, an optical sensor circuit 308, and an active foot pad 310. The active foot pad 310 may be housed on a bracket such that it protrudes from an opening in the bottom case 312. As illustrated, the optical sensor circuit 308 is mechanically coupled or linked with the active foot pad 310 as they are both configured on the same bracket.

As a result, when the active foot pad 310 is moved based at least on pressure on the mouse 300, the movement of the optical sensor circuit 308 is synchronized with the movement of the active foot pad 308. As a result, the optical sensor within the optical sensor circuit 308 is able to keep the same focus distance from the tactile switch attached to the active foot pad 310. This configuration allows the placement of the active foot pad 310 at the bottom of the mouse 300, thus the top surface of the mouse 300 has no split top key or any gaps, which is beneficial for a seamless and compact design of the mouse 300, which is less susceptible to mechanical malfunctions over the life of the mouse 300.

Figure 4:
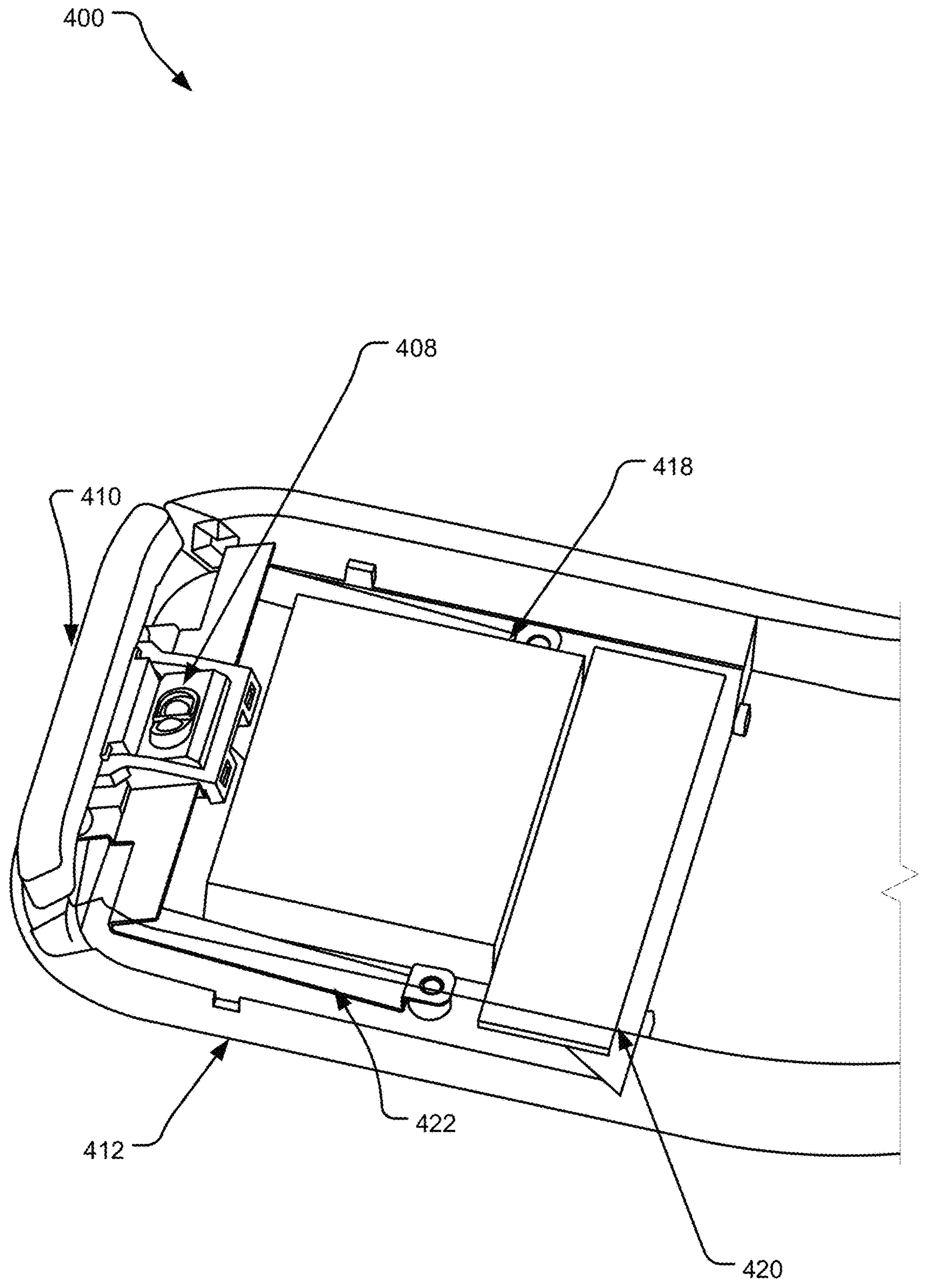
FIG. 4 illustrates a perspective view of a section of the mouse disclosed herein.

FIG. 4 illustrates a perspective view of a section of the mouse 400 disclosed herein. Specifically, the section of the mouse 400 illustrates a bottom case 412 of the mouse 400 housing a metal clip 422, a PCBA 420, a rechargeable battery 418, an optical sensor circuit 408, and an active foot pad 410. The active foot pad 410 may be housed on a bracket such that it protrudes from an opening in the bottom case 412. As illustrated, the optical sensor circuit 408 is mechanically coupled or linked with the active foot pad 410 as they are both configured on the same bracket.

Figure 5:
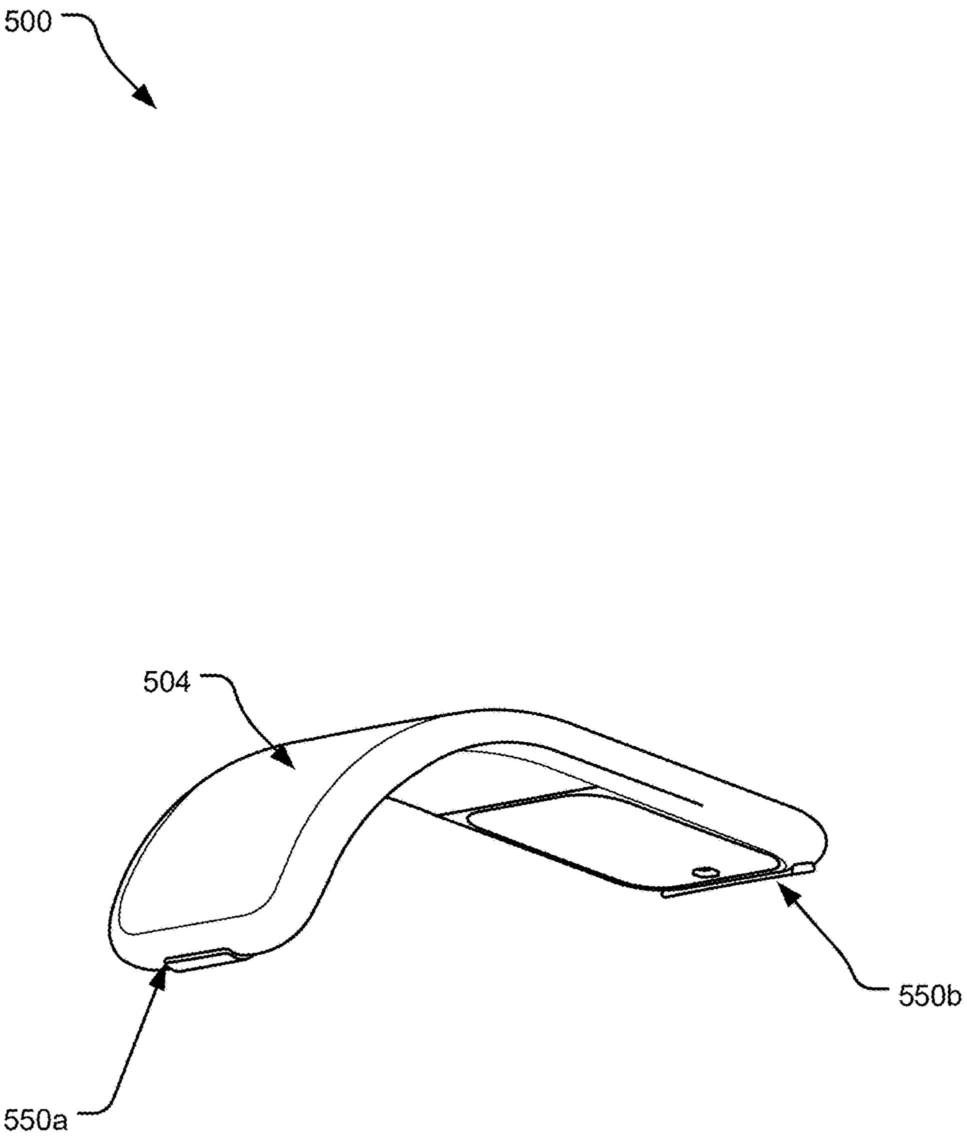
FIG. 5 illustrates an alternative external illustration of the mouse disclosed herein.

FIG. 5 illustrates an alternative external illustration of the mouse 500 disclosed herein. Specifically, the illustrated view of the mouse 500 shows a seamless top surface 504, an active foot pad 550*b* at a rear bottom edge of the mouse 500 and an inactive foot pad 550*a* at a front bottom edge of the mouse 500.

Figure 6:
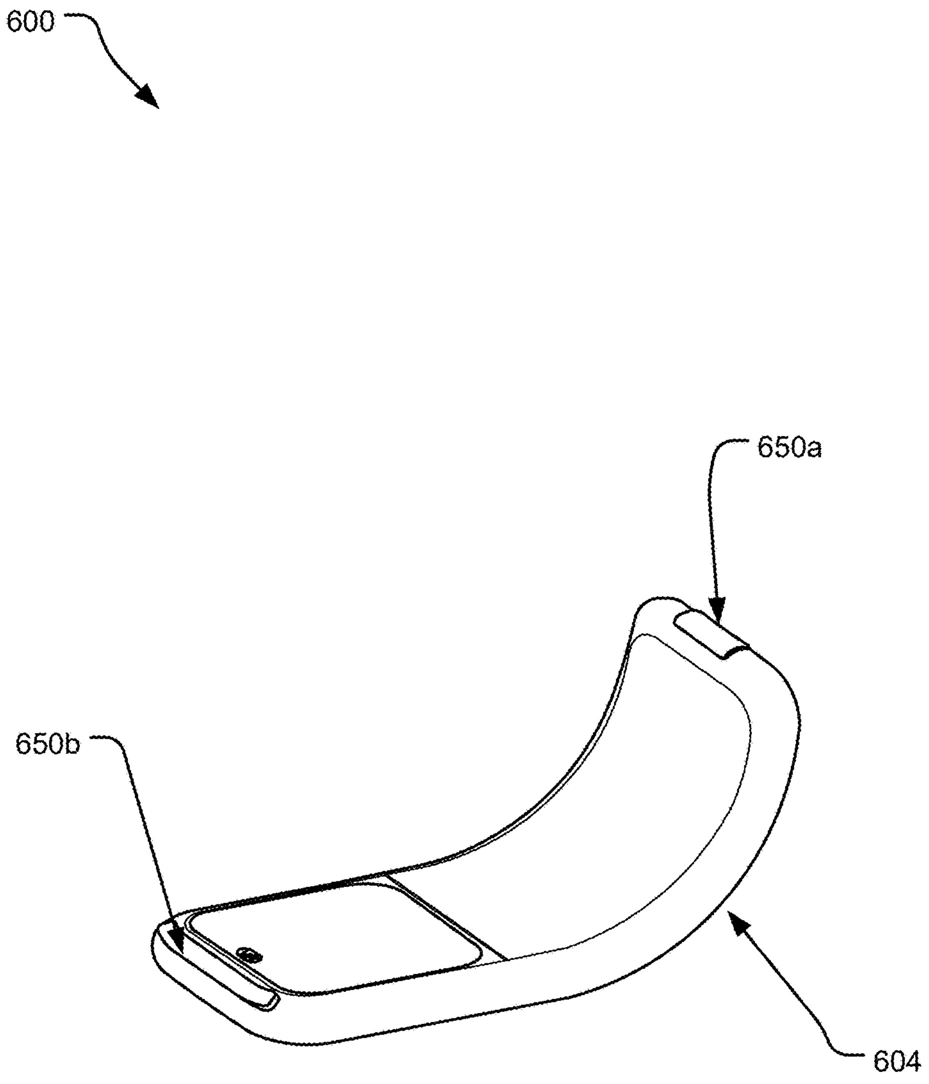
FIG. 6 illustrates another alternative external illustration of the mouse disclosed herein.

FIG. 6 illustrates another alternative external illustration of the mouse 600 disclosed herein. Specifically, the illustrated view of the mouse 600. Specifically, the illustrated view of the mouse 600 shows a seamless top surface 604, an active foot pad 650*b* at a rear bottom edge of the mouse 600 and an inactive foot pad 650*a* at a front bottom edge of the mouse 600.

Figure 7:
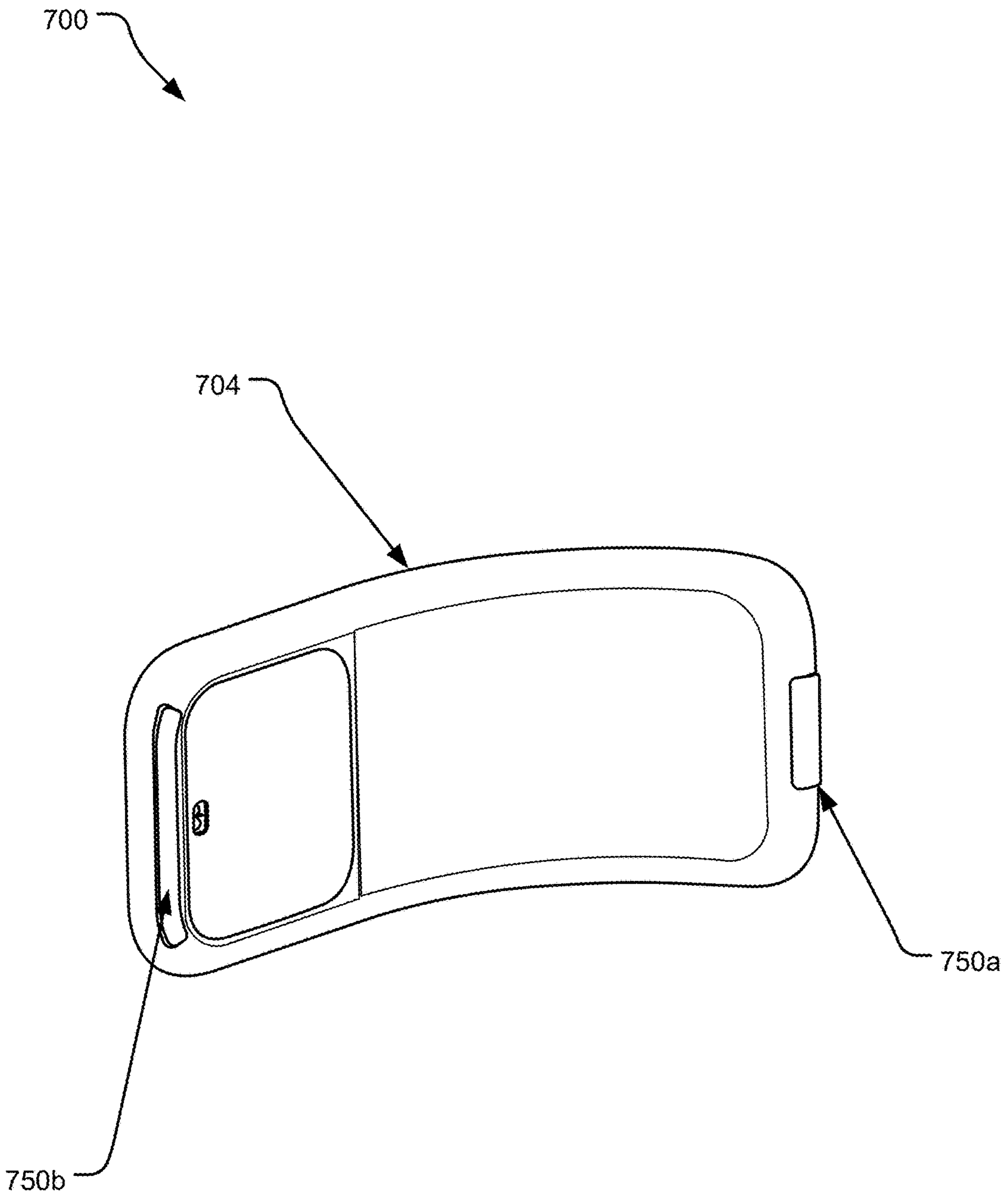
FIG. 7 illustrates another alternative external illustration of the mouse disclosed herein.

FIG. 7 illustrates another alternative external illustration of the mouse 700 disclosed herein. Specifically, the illustrated view of the mouse 700. Specifically, the illustrated view of the mouse 700. Specifically, the illustrated view of the mouse 700 shows a seamless arc shaped top surface 704, an active foot pad 750*b* at a rear bottom edge of the mouse 700 and an inactive foot pad 750*a* at a front bottom edge of the mouse 700.

An input component of a computing device disclosed herein includes a foot pad configured to movably rest on a surface, a tactile switch configured to be attached to the foot pad, the tactile switch configured to generate an optical signal based at least on compression of the foot pad, and an optical sensor circuit configured to detect the optical signal, wherein the optical sensor circuit is mechanically coupled to the foot pad.

A mouse device disclosed herein includes an active foot pad configured to movably rest on a surface, a tactile switch configured to be attached to the active foot pad, the tactile switch configured to generate an optical signal based at least on compression of the active foot pad, and an optical sensor circuit configured to detect the optical signal, wherein the optical sensor circuit is mechanically coupled to the active foot pad.

An alternative implementation of a mouse device disclosed herein includes an active foot pad configured to movably rest on a surface, a tactile switch configured to be attached to the active foot pad, the tactile switch configured to generate an optical signal based at least on compression of the active foot pad, an optical sensor circuit configured to detect the optical signal, wherein the optical sensor circuit is mechanically coupled to the active foot pad; and an arc shaped core with a bottom front edge and a bottom rear edge, each of the bottom front edge and the bottom rear edge configured to rest on the surface, wherein the active foot pad is configured near the bottom rear edge of the core.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. An input component of a computing device, comprising:

a foot pad configured to movably rest on a surface;

a tactile switch configured to be attached to the foot pad, the tactile switch configured to generate an optical signal based at least on compression of the foot pad, wherein the optical signal is commensurate to a pressure applied by a user on a top surface of the input component; and an optical sensor circuit configured to detect the optical signal via an optical sensor, wherein the optical sensor circuit is mechanically coupled to the foot pad, wherein the optical sensor and the foot pad are mounted on a bracket so that a movement of the foot pad away from the surface and into the housing causes corresponding movement of the optical sensor vertically away from the surface and into the housing.

2. The input component of claim 1, further comprising a core with a bottom front edge and a bottom rear edge, each of the bottom front edge and the bottom rear edge configured to rest on the surface, wherein the foot pad is configured near the bottom rear edge of the core.

3. The input component of claim 2, wherein the foot pad is at least partially enclosed within the core along the bottom rear edge and is partially protruding from the bottom rear edge.

4. The input component of claim 2, wherein the foot pad is configured to be compressed away from the surface and into the core based at least on pressure on top of the core.

5. The input component of claim 2, wherein the core is an arc shaped core.

6. The input component of claim 2, wherein each of the foot pad, the tactile switch, and the optical sensor circuit are mounted using a bracket such that the movement of each of the foot pad, the tactile switch, and the optical sensor circuit are synchronized based at least on to pressure on the core.

7. The input component of claim 6, further comprising a metal clip mechanically attached to the bracket, wherein the metal clip is configured to provide a spring mechanism to the bracket.

8. The input component of claim 6, further comprising a printed circuit board assembly (PCBA) housed within the core, wherein the PCBA receives signals from the optical sensor circuit and determines the pressure level on the core.

9. The input component of claim 2, wherein a top surface of the core is seamless with no openings.

10. A mouse device, comprising:

an active foot pad configured to movably rest on a surface;

a tactile switch configured to be attached to the active foot pad, the tactile switch configured to generate an optical signal based at least on compression of the active foot pad, wherein the optical signal is commensurate to a pressure applied by a user on a top surface of the input component; and an optical sensor circuit configured to detect the optical signal via an optical sensor, wherein the optical sensor circuit is mechanically coupled to the active foot pad, wherein the optical sensor and the foot pad are mounted on a bracket so that a movement of the foot pad away from the surface and into the housing causes corresponding movement of the optical sensor vertically away from the surface and into the housing.

11. The mouse device of claim 10, further comprising a core with a bottom front edge and a bottom rear edge, each of the bottom front edge and the bottom rear edge configured to rest on the surface, wherein the active foot pad is configured near the bottom rear edge of the core.

12. The mouse device of claim 11, wherein the active foot pad is at least partially enclosed within the core along the bottom rear edge and is partially protruding from the bottom rear edge.

13. The mouse device of claim 11, wherein the active foot pad is configured to be compressed away from the surface and into the core based at least on pressure on top of the core.

14. The mouse device of claim 11, wherein the core is an arc shaped core.

15. The mouse device of claim 11, wherein each of the active foot pad, the tactile switch, and the optical sensor circuit are mounted using a bracket such that the movement of each of the active foot pad, the tactile switch, and the optical sensor circuit are synchronized based at least on pressure on the core.

16. The mouse device of claim 15, further comprising a metal clip mechanically attached to the bracket, wherein the metal clip is configured to provide a spring mechanism to the bracket.

17. The mouse device of claim 15, further comprising a printed circuit board assembly (PCBA) housed within the core, wherein the PCBA receives signals from the optical sensor circuit and determines the pressure level on the core.

18. A mouse device, comprising:

an active foot pad configured to movably rest on a surface;

a tactile switch configured to be attached to the active foot pad, the tactile switch configured to generate an optical signal based at least on compression of the active foot pad, wherein the optical signal is commensurate to a pressure applied by a user on a top surface of the input component;

an optical sensor circuit configured to detect the optical signal via an optical sensor, wherein the optical sensor circuit is mechanically coupled to the active foot pad, wherein the optical sensor and the foot pad are mounted on a bracket so that a movement of the foot pad away from the surface and into the housing causes corresponding movement of the optical sensor vertically away from the surface and into the housing; and an arc shaped core with a bottom front edge and a bottom rear edge, each of the bottom front edge and the bottom rear edge configured to rest on the surface, wherein the active foot pad is configured near the bottom rear edge of the core.

19. The mouse device of claim 18, wherein each of the active foot pad, the tactile switch, and the optical sensor circuit are mounted using a bracket such that the movement of each of the active foot pad, the tactile switch, and the optical sensor circuit are synchronized based at least on pressure on the core.

20. The mouse device of claim 19, further comprising a metal clip mechanically attached to the bracket, wherein the metal clip is configured to provide a spring mechanism to the bracket.

* * * * *